United States Patent [19]
Anaya et al.

[11] Patent Number: 5,940,828
[45] Date of Patent: Aug. 17, 1999

[54] LOCKING CONTENTION RESOLUTION FOR SHARED RESOURCES

[75] Inventors: Jaime F. Anaya; John A. Kistler, both of San Jose; Frank Cullen Sherwin, Morgan Hill; Jay A. Yothers, Gilroy, all of Calif.

[73] Assignee: International Business Machines Corporation, Armonk, N.Y.

[21] Appl. No.: 08/972,327

[22] Filed: Nov. 18, 1997

[51] Int. Cl.⁶ .................................................. G06F 17/30
[52] U.S. Cl. ................................................. 707/8; 395/726
[58] Field of Search ................. 395/726; 707/8

[56] References Cited

U.S. PATENT DOCUMENTS

| | | | |
|---|---|---|---|
| 5,193,188 | 3/1993 | Franaszek et al. | 395/650 |
| 5,353,425 | 10/1994 | Malamy et al. | 395/425 |
| 5,551,046 | 8/1996 | Mohan et al. | 707/8 |
| 5,566,305 | 10/1996 | Levenstein | 395/299 |
| 5,596,754 | 1/1997 | Lomet | 395/726 |
| 5,734,909 | 3/1998 | Bennett | 395/726 |
| 5,742,830 | 4/1998 | Elko et al. | 395/728 |
| 5,774,731 | 6/1998 | Higuchi et al. | 395/726 |
| 5,832,484 | 11/1998 | Sankaran et al. | 707/8 |
| 5,872,981 | 2/1999 | Waddington et al. | 395/726 |

OTHER PUBLICATIONS

"Locking Processing In A Shared Data Base Environment", D. Gawlick, IBM Technical Disclosure Bulletin, vol. 25, No. 10, pp. 4980–4985, Mar. 1983.

*Primary Examiner*—Wayne Amsbury
*Attorney, Agent, or Firm*—Gray Cary Ware Freidenrich

[57] ABSTRACT

Two methods for resolving locking contention for pseudo-deadlocked transactions without rolling back or aborting any of the deadlocked transactions are provided. In one method, one or more shared lock requests from deadlocked transactions are granted ahead of at least one exclusive lock request from a deadlocked transaction. In another method, all shared lock requests from deadlocked transactions are granted ahead of all exclusive lock requests from deadlocked transactions.

22 Claims, 4 Drawing Sheets

| TRANSACTION STATUS TABLE ||||| 
|---|---|---|---|---|
| TRANS. NO. | RESOURCE | DESIRED MODE | HELD MODE | TRANS. STATUS |
| 1 | A | SHARED | SHARED | ACTIVE |
| 2 | B | SHARED | SHARED | WAIT |
| 3 | A | EXCLUSIVE | | WAIT |
| 4 | B | EXCLUSIVE | | WAIT |
| 1 | B | SHARED | SHARED | ACTIVE |
| 2 | A | SHARED | | WAIT |
| 5 | A | SHARED | | WAIT |
| 6 | B | SHARED | | WAIT |

| TRANSACTION STATUS TABLE | | | | |
|---|---|---|---|---|
| TRANS. NO. | RESOURCE | DESIRED MODE | HELD MODE | TRANS. STATUS |
| 1 | A | SHARED | SHARED | DEADLOCK |
| 2 | B | SHARED | SHARED | DEADLOCK |
| 3 | A | EXCLUSIVE | | DEADLOCK |
| 4 | B | EXCLUSIVE | | DEADLOCK |
| 1 | B | SHARED | | DEADLOCK |
| 2 | A | SHARED | | DEADLOCK |
| 5 | A | SHARED | | WAIT |
| 6 | B | SHARED | | WAIT |

FIG. 2

| QUEUE FOR RESOURCE A | | |
|---|---|---|
| TRANS. NO. | DESIRED MODE | LOCK STATUS |
| 1 | SHARED | GRANTED |
| 3 | EXCLUSIVE | WAITING |
| 2 | SHARED | WAITING |
| 5 | SHARED | WAITING |

FIG. 3

| QUEUE FOR RESOURCE B | | |
|---|---|---|
| TRANS. NO. | DESIRED MODE | LOCK STATUS |
| 2 | SHARED | GRANTED |
| 4 | EXCLUSIVE | WAITING |
| 1 | SHARED | WAITING |
| 6 | SHARED | WAITING |

FIG. 4

| TRANSACTION STATUS TABLE ||||
|---|---|---|---|---|
| TRANS. NO. | RESOURCE | DESIRED MODE | HELD MODE | TRANS. STATUS |
| 1 | A | SHARED | SHARED | ACTIVE |
| 2 | B | SHARED | SHARED | WAIT |
| 3 | A | EXCLUSIVE | | WAIT |
| 4 | B | EXCLUSIVE | | WAIT |
| 1 | B | SHARED | SHARED | ACTIVE |
| 2 | A | SHARED | | WAIT |
| 5 | A | SHARED | | WAIT |
| 6 | B | SHARED | | WAIT |

FIG. 5

| QUEUE FOR RESOURCE A |||
|---|---|---|
| TRANS. NO. | DESIRED MODE | LOCK STATUS |
| 1 | SHARED | GRANTED |
| 3 | EXCLUSIVE | WAITING |
| 2 | SHARED | WAITING |
| 5 | SHARED | WAITING |

FIG. 6

| QUEUE FOR RESOURCE B |||
|---|---|---|
| TRANS. NO. | DESIRED MODE | LOCK STATUS |
| 2 | SHARED | GRANTED |
| 1 | SHARED | GRANTED |
| 4 | EXCLUSIVE | WAITING |
| 6 | SHARED | WAITING |

FIG. 7

TRANSACTION STATUS TABLE

| TRANS. NO. | RESOURCE | DESIRED MODE | HELD MODE | TRANS. STATUS |
|---|---|---|---|---|
| 1 | A | SHARED | SHARED | ACTIVE |
| 2 | B | SHARED | SHARED | ACTIVE |
| 3 | A | EXCLUSIVE |  | WAIT |
| 4 | B | EXCLUSIVE |  | WAIT |
| 1 | B | SHARED | SHARED | ACTIVE |
| 2 | A | SHARED | SHARED | ACTIVE |
| 5 | A | SHARED |  | WAIT |
| 6 | B | SHARED |  | WAIT |

FIG. 8

QUEUE FOR RESOURCE A

| TRANS. NO. | DESIRED MODE | LOCK STATUS |
|---|---|---|
| 1 | SHARED | GRANTED |
| 2 | SHARED | GRANTED |
| 3 | EXCLUSIVE | WAITING |
| 5 | SHARED | WAITING |

FIG. 9

QUEUE FOR RESOURCE B

| TRANS. NO. | DESIRED MODE | LOCK STATUS |
|---|---|---|
| 2 | SHARED | GRANTED |
| 1 | SHARED | GRANTED |
| 4 | EXCLUSIVE | WAITING |
| 6 | SHARED | WAITING |

FIG. 10

LOCKING CONTENTION RESOLUTION FOR SHARED RESOURCES

BACKGROUND OF THE INVENTION

1. Field of the Invention

This invention relates to resolving locking contention for deadlocked tasks, and more particularly, to resolving locking contention for waiting transactions that are not truly deadlocked.

2. Description of the Related Art

Tasks (also, "processes") are streams of activity. Transactions are particular kinds of tasks that must either be entirely completed or rolled back. When two or more tasks compete for two or more resources, the further execution of either, or both may be blocked. When tasks cannot proceed because of competition for the same resource, they are said to be "deadlocked". A deadlock is typically resolved by termination ("abortion") or rollback of one or more of the deadlocked tasks.

Techniques have been developed to handle or allocate requests from different tasks to access or use a data processing system resource. The task may be a database operation, file or data record request, register access or use, or a memory access request, for example. The resource may be any form of data storage such as a hard disk drive, a floppy drive, a CDROM, a random access memory (RAM), a tape drive, a register or a cache in a microprocessor where individual bytes of data, records, or files may be stored. In other instances, a resource may comprise a series of records stored in any form of the above-mentioned data storage. In addition, the series of records may be stored in several different data storage sites in one data processing system or across multiple data processing systems such as a distributed data processing system.

In order to control access to a resource in a transaction processing system, transactions are required to have a "lock" on the resource before they are granted access to it. To receive a lock on a resource, transactions submit requests for locked use of the resource. A lock mode signifies the kind of lock requested (at least X and S). The status of a request may be at least either GRANTED or WAITING. The lock request may be for exclusive (X) or shared (S) use of the resource. The lock requests may be stored in queues, stacks, linked lists, chains, tables, trees or the like and locks may be granted to transactions on a first in and first out (FIFO) or priority basis or any other basis known in the art. Transactions may require access to several resources before their underlying operations can be completed. For example, a join command (JOIN) in a database application may have to access two tables. In such a case, the transaction submits requests for locks on each of the resources needed to complete the operation. Once the operation is complete, the locks on the resources are released by the transaction.

Lock acquisition is automated in many applications. For example in database applications, a database management system (DBMS) generates the appropriate lock requests for resource use during processing of a database query (or transaction) generated by a user or an application in a distributed data processing system. The lock requests are processed by a lock manager that may include a concurrency control component that detects deadlocks, and a resolution component that resolves detected deadlocks. Deadlock detection and resolution require maintenance and processing of the structures mentioned above.

Different types of transactions may require either shared or exclusive locks on one or more resources to be completed. For example, a JOIN requires shared locks on the resources that contain the records to be joined. An UPDATE, however, requires exclusive access to the resources containing records to be changed. Frequently, multiple transactions require access to the same resource. If two or more transactions need only shared access to the resource, they may be concurrently granted shared locks for the resource. As a consequence, these transactions can execute in parallel (provided all the locks needed for each transaction have been granted.)

As noted above, in order to control access to resources, lock requests are received and processed by a lock manager which serializes access to the resources, based on lock requests. Serialization of access can sometimes prevent access to a resource by any transactions. This may occur, for example, when several transactions request simultaneous access to the same resources, with some of the transactions granted some of the locks but none of the transactions being granted all the locks needed to complete because of contention with the other transactions. When this occurs, the transactions are deadlocked. For example, deadlock commonly occurs when two transactions require access to two or more resources, and each receives a lock to one of the resources. When this occurs, one of the transactions (the "victim") is rolled back or aborted so the other can be granted the lock needed to complete. The victim transaction must release locks held, roll back and then generate new requests for locks on the resources it needs to complete.

To illustrate an example of deadlock between transactions, consider the following scenario: Transaction 1 needs exclusive access to resources A and B to complete, and transaction 2 needs exclusive access to resources B and A to complete. Transaction 1 requests a lock on resource A, while transaction 2 requests a lock on resource B. These lock requests are granted (i.e., transaction 1 receives an exclusive lock on resource A and transaction number 2 receives an exclusive lock for resource B). Then, transaction 1 requests a lock on resource B and transaction 2 requests a lock on resource A. Resource A, however, is exclusively locked by transaction 1 and resource B is exclusively locked by transaction 2. Therefore, neither transaction 1 or 2 can be granted all the locks need to complete and neither transaction will release their current locks until they complete; the transactions are deadlocked.

In order to resolve this deadlock, either transaction 1 or 2 is victimized by rollback or abortion. Then, the victim transaction will release its held lock, allowing the non-victim transaction to be granted the additional lock needed to complete. After the transaction is complete, it will release the locks on resources A and B. Then, the victim transaction's resubmitted requests for exclusive locks for resource A and B can be granted. This, of course, is inefficient, since work must be rolled back. In the preceding example, transactions 1 and 2 would not have been deadlocked if they both needed only shared access to resource A and B. In this scenario shared locks could be granted to both transactions for resources A and B. Then, the transactions could complete simultaneously.

Consider the scenario illustrated in the transaction status table of FIG. 2, where transactions 1 and 2 require shared access to resources A and B and transactions 3 and 4 require exclusive access to resources A and B, respectively. Further, transactions 3 and 4 request exclusive locks for resources A and B immediately after transaction 1 requests and is granted a shared lock for resource A and transaction 2 requests and is granted a shared lock to resource B. Transactions 1 and 2 would again be deadlocked even though they only require shared locks for resource A and B to complete.

The request of transaction 3 for an exclusive lock for resource A is located between the requests of transaction 1 and 2 for shared locks for resource A in the status table. Likewise, the request of transaction 4 for an exclusive lock on resource B is located between the request of transaction 2 and 1 for shared locks on resource B. As a consequence, shared locks for resources A and B to transactions 1 and 2 can not be granted since the requests are not contiguous in the queues for these resources. Thus, transactions 1, 2, 3, and 4 are deadlocked, although transaction 1 and 2 are only "pseudo-deadlocked" since they could execute simultaneously because they both require only shared locks on one or more resources. The intervening exclusive lock requests by transactions 3 and 4, however, prevent grouping and assignment of shared locks for transactions 1 and 2. In order to resolve this deadlock, the prior art teaches victimization of either transaction 1 or 2. This permits either transaction 3 or 4 to be granted the exclusive lock on resource A or resource B. The transaction completes, then releases its lock on resource A or resource B. Then, non-victim transaction 1 or 2 can be granted the second shared lock it needs to complete. The transaction completes, and then releases both shared locks. Likewise, either transaction 3 or 4 receives its lock, completes, and releases the lock. Finally, the victim transaction 1 or 2 may be granted shared locks for resource A and B, complete, and release the locks.

This method for resolving locking contention for pseudo-deadlocked transactions is inefficient. The aborted or rolled back transaction must release its held locks and resubmit requests for those locks. In addition, if the lock requests for the resources were managed more efficiently, transactions 1 and 2 could have executed concurrently, since they required only shared locks. Thus, an efficient method or technique is needed to resolve locking contention for pseudo-deadlocked transactions.

SUMMARY OF THE INVENTION

The invention concerns the processing of lock requests and presumes a mechanism for serializing the requests. Such a mechanism is referred to in the description of the invention as a "queue" for illustration and convenience. The term "queue", when used in the description and in the claims, is to be read broadly, within the scope of the definition given in the OXFORD DICTIONARY OF COMPUTING, Fourth Edition, at page 403:

"A linear list where all insertions are made at one end of the list and all removals and accesses at the other."

Those skilled in the art will appreciate that other functionally equivalent serialization mechanisms are available to be used instead of a queue in the practice of this invention. As discussed in the Background, such serialization mechanisms include, without limit, stacks, linked lists, chains, tables, and trees in addition to queues. As a result, while we use the term "queue" to describe specific methods for practicing the invention, we intend that the invention be practiced with any mechanism that serializes lock requests.

In a queue (or an equivalent mechanism) the status of a lock request at the head of the queue is GRANTED. Other lock requests in the queue may have GRANTED or WAITING status. The invention presumes ordering of lock requests, for example, by time of receipt by a lock manager. Further presumed is the ability of a system to resolve conflicts not only by rollback and termination of transactions or processes, but also by delay. Finally, while the following summary and detailed description discuss the invention in the context of transaction processing, it is intended that the invention's principles be generally applicable to process management.

One aspect of this invention is a method of managing lock requests for a resource, using a mechanism that serializes lock requests and that has received at least one exclusive lock request submitted by at least one deadlocked transaction, and at least one shared lock request from at least one deadlocked transaction. In this case, the method of the present invention determines whether at least one exclusive lock request has been requested ahead of at least one shared lock request. If at least one exclusive lock request has been requested ahead of at least one shared lock request, then at least one shared lock request is granted ahead of at least one exclusive lock request pending in the serialization mechanism. This method may resolve a locking contention for the deadlocked transaction.

To increase the efficiency of managing lock processing, the method may grant all shared lock requests from deadlocked transactions that have been requested ahead of at least one exclusive lock request when at least one exclusive lock request has been requested ahead of at least one shared lock request.

Further, the method may first determine whether at least one shared lock request from a deadlocked transaction for the resource has been granted. The method may then determine whether at least one exclusive lock request has been requested ahead of at least one shared lock request. Finally, the method may grant at least one shared lock request ahead of at least one exclusive lock request for a resource when at least one exclusive lock request has been requested ahead of at least one shared lock request and at least one shared lock request from a deadlocked transaction has been granted for the resource. In this case, the method may also grant all contiguous shared requests for deadlocked transactions ahead of at least one exclusive lock request for a deadlocked transaction when at least one exclusive lock request has been requested ahead of at least one shared lock request and at least one shared lock request from a deadlocked transaction has been granted. In addition, the method may grant all shared lock requests from deadlock transactions, whether contiguous or not, before at least one exclusive lock request from a deadlock transaction when at least one shared lock request from a deadlocked transaction has been granted.

In another aspect of the invention, the method manages a plurality of serialization mechanisms for a plurality of resources where at least one exclusive lock request from at least one deadlocked transaction and at least one shared lock request from at least one deadlocked transaction have been received for each resource. This method may determine whether at least one exclusive lock request has been requested ahead of at least one shared lock request for each of the plurality of resource. Further, this method may grant at least one shared lock request ahead of at least one exclusive lock request for each of the plurality of resources when at least one exclusive lock request has been requested ahead of at least one shared lock request. The other steps presented above for increasing the efficiency of management may also be applied to this method.

BRIEF DESCRIPTION OF THE DRAWING

FIG. 2 is a transaction status table illustrating pseudo-deadlocked transactions.

FIG. 3 is a table for a lock request queue of a resource A involved in the pseudo-deadlocked transactions shown in FIG. 2.

FIG. 4 is a table for a lock request queue of a resource B involved in the pseudo-deadlocked transactions shown in FIG. 2.

FIG. 5 is a transaction status table illustrating a first method of the present invention for resolving locking contention for pseudo-deadlocked transactions.

FIG. 6 is a table for a lock request queue of resource A after execution of the first method of the present invention for resolving locking contention for pseudo-deadlocked transactions.

FIG. 7 is a table for a lock request queue of resource B after execution of the first method of the present invention for resolving locking contention for pseudo-deadlocked transactions.

FIG. 8 is a transaction status table illustrating a second method of the present invention for resolving locking contention for pseudo-deadlocked transactions.

FIG. 9 is a table for a lock request queue of resource A after execution of the second method of the present invention for resolving locking contention for pseudo-deadlocked transactions.

FIG. 10 is a table for a lock request queue of resource B after execution of the second method of the present invention for resolving locking contention for pseudo-deadlocked transactions.

DETAILED DESCRIPTION OF THE PREFERRED EMBODIMENTS

Figure 1:
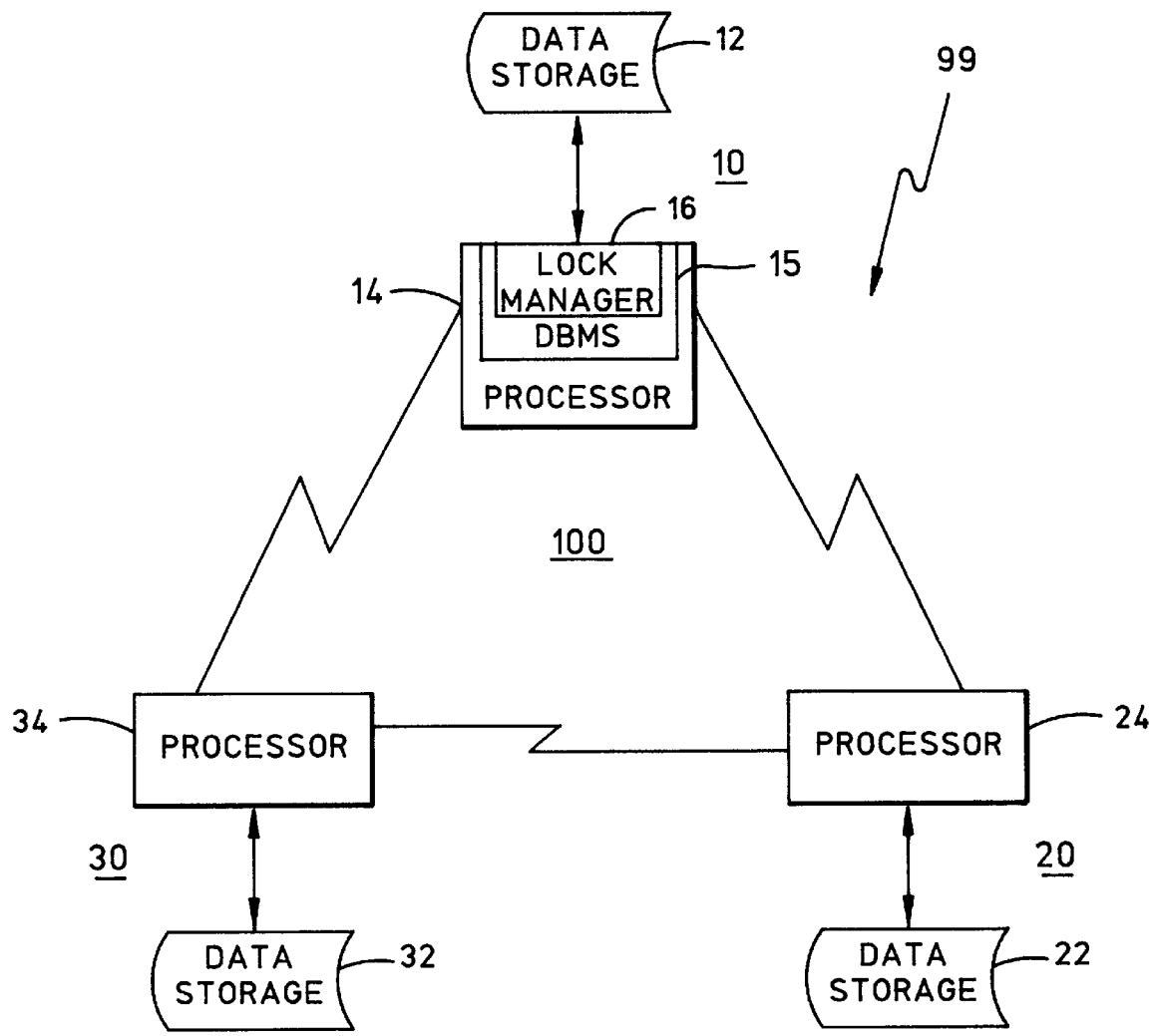
FIG. 1 is a block diagram of a distributed data processing system where the present invention may be employed.

Preferred embodiments of the invention are presented with reference to FIGS. 1–10. FIG. 1 is a diagram of a distributed data processing system 99 including a network 100 where the present invention may be employed. The network 100 connects three data processing sites 10, 20, and 30 which are networked together. Each data processing site 10, 20, and 30 includes a processor 14, 24, and 34 and data storage 12, 22, and 32. In order to manage access to resources on data storage 12, 22, and 32, programs executed on processors 14, 24, and 34 maintain status tables and serialization mechanisms that serialize lock requests from tasks for access to resources on their attached data storage 12, 22, and 32. An example of such a task is a transaction executing in a transaction processing system such as a database management system (DBMS). A detailed architecture and implementation of a serialization mechanism for lock processing in a transaction processing system is set out in U.S. Pat. No. 5,193,188, commonly assigned with this application and incorporated by reference. These mechanisms serialize requests for locks; they are referred to as "serialization mechanisms" and are exemplified by lock request queues. Each serialization mechanism has an end where lock requests are inserted, and a head.

A DBMS maintains queues for requests for access to tuples of tables. The tuples of a table may be stored in one data storage 12, 22, and 32, or across several of the data storage 12, 22, and 32. In order for a DBMS executing on one of the processors 14, 24, and 34 to maintain data integrity of tables located in data storages 12, 22, and 32, a lock manager of the DBMS maintains queues and grants locks to read or update tuples located in the data storages 12, 22, and 32. Transaction status tables may be maintained at each data processing site 10, 20, 30 to manage execution of transactions at each site. Such tables reveal, for any request for access to protected resources at the site, at least the identity of the requesting transaction, the resource requested, the desired mode of the requested lock, and the status of the transaction. Status tables are illustrated in FIGS. 2, 5 and 8. Queues of lock requests generated for transactions may be maintained for each resource. Such queues show at least the requesting transaction, the desired lock mode, and the current status of the lock. Lock request queues are illustrated in FIGS. 3, 4, 6, 7, 9 and 10. Representative architecture for lock management in a DBMS is shown in the processor 14, where a DBMS 15 includes a lock manager 16 that maintains data structures necessary to implement and operate transaction status tables and queues of lock requests for transactions that may execute in the processor 14 or any other processor in the system 99.

FIGS. 2–10 illustrate different lock request management scenarios for six transactions requesting shared or exclusive access to resources A and B. In detail, the figures illustrate data structures maintained by a DBMS lock manager to queue and manage the processing of lock requests. Shown in these figures are tables of the status of transaction lock requests and lock request queues for the resources A and B. FIGS. 2–4 illustrate the state of lock request queues during the pseudo-deadlock condition presented in the background of the invention, with the addition of two more transactions. FIGS. 5–7 and 8–10 show two different methods of resolving the locking contention for the pseudo-deadlock condition presented in FIGS. 2–4.

The transaction status table of FIG. 2 shows the order and status of transaction lock requests for resources A and B for the six different transactions, numbered 1–6. Transactions 1 and 2 both require shared locks on resources A and B to complete their underlying operations (such as a JOIN operation on tuples located at resources A and B). Transaction 3 requires an exclusive lock on resource A to complete its underlying operation. Transaction 4 requires an exclusive lock on resource B to complete its underlying operation. Transaction 5 requires a shared lock on resource A to complete its underlying operation. Finally, transaction number 6 requires a shared lock on resource B to complete its underlying operation.

As shown in the table of FIG. 2, in order:

1) transaction 1 requested a shared lock of resource A and the request was granted (the table of FIG. 3 shows that transaction 1's request for a shared lock is at the head of the queue and has been granted);
2) transaction 2 requested a shared lock on resource B and the request was granted (the table of FIG. 4 shows that transaction 2's request for a shared lock is at the head of the queue and has been granted);
3) transaction 3 requested an exclusive lock on resource A;
4) transaction 4 requested an exclusive lock on resource B;
5) transaction 1 requested a shared lock on resource B;
6) transaction 2 requested a shared lock on resource A;
7) transaction 5 requested a shared lock on resource A; and
8) transaction 6 requested a shared lock on resource B.

As noted above, both transactions 1 and 2 need shared locks of resource A and B before they can complete their operations. As shown in FIGS. 3 and 4, however transaction 1 has only a shared lock for resource A and transaction 2 has only a shared lock for resource B. The next requests in the lock request queues for resources A and B are for exclusive locks by transactions 3 and 4.

The requests for shared and exclusive locks of resource A or B can not be combined. As a consequence, none of transactions 1, 2, 3 and 4 can be completed. These transactions are deadlocked as shown by the status column of table of FIG. 2. A prior art technique for resolving the locking contention of these deadlocked transactions involved victimizing one of the deadlocked transactions so the others may proceed Rolling back or aborting transaction 1, 2, 3, or 4 allows the other transactions to get locks needed to complete their underlying operations in serial order. The victimized transaction must resubmit its lock requests. These requests are placed at the ends of the queues so that transactions 5 and 6 may be completed before the victimized transaction receives the lock grants need to complete its underlying operation. This technique for resolving locking contention is inefficient, since a transaction is rolled back or aborted and later restarted. In addition, transactions that could perform in parallel instead perform serially. A method of the present invention for resolving the locking contention for the pseudo-deadlocked transactions which does not require victimizing one of the deadlocked transactions is presented with reference to FIGS. 5–7.

In this method, all shared lock requests from other deadlocked transactions are granted ahead of at least one exclusive lock request from the deadlocked transaction in the lock request queue. In this example, the shared lock request from transaction 1 is granted ahead of the exclusive lock request from transaction 4 in the lock request queue for resource B as shown in the table of FIG. 7. This enables transaction 1 to acquire both shared locks it needs to complete its underlying operation, as shown in the table of FIG. 5. This method thus resolves the locking contention for the pseudo-deadlocked transactions. Transactions 1, 3, 2, 4, 5, and 6 can complete their underlying operations and release their locks in due order. This method provides an efficient means of resolving locking contention for pseudo-deadlocked transactions, since no transactions are rolled back or aborted. In order to further increase the efficiency of resolving such a locking contention, a second method of the present invention is presented with reference to FIGS. 8–10.

In this second method, all shared lock requests from deadlocked transactions are granted ahead of all exclusive lock requests from other deadlocked transactions received ahead of the shared lock requests in the lock request queues. In this example, the shared lock request from transaction 1 is granted ahead of the exclusive lock request from transaction 4 in the lock request queue for resource B and the shared lock request from transaction 2 is granted ahead of the exclusive lock request from transaction 3 in the lock request queue for resource A as shown in the tables of FIGS. 10 and 9. This enables transactions 1 and 2 to acquire shared locks on resources A and B, as shown in the table of FIG. 8. This method also resolves the locking contention for the pseudo-deadlocked transactions but does so even more efficiently than the previously-presented method. Now, transactions 1 and 2 can be completed in parallel, then transactions 3 and 4, in parallel, and finally transactions 5 and 6, in parallel. This method thus provides an even more efficient means of resolving locking contention for pseudo-deadlocked transactions.

The same two methods presented above could be used to resolve locking contention where there are three or more resources being accessed by pseudo-deadlocked transactions. Further, transactions that are involved in a pseudo-deadlock need not be contiguous (or adjacent). The minimum requirements for a transaction to participate in either of these methods are that the transaction be requesting a shared lock and that the transaction be one of the set of transactions involved in the pseudo-deadlock condition being resolved. Moreover, granting a lock request ahead of other lock requests may, or may not, be accompanied by reordering of the requests.

The inventors presume a solution to the "Convoy Problem". The convoy problem occurs when there is some number of processes that require access to a given resource and most are willing to share the resource, but one process requires exclusive use of the resource. If, when the exclusive requester makes its lock request, the resource is currently being used by one or more other processes, the exclusive requester must wait. If another process requests access that is willing to share the resource with the others that already have it, the lock manager may grant access to the resource to this process as well. If the lock manager grants processes willing to share a particular resource access to that resource even though a process requiring exclusive use of the resource is waiting for it, a sufficiently dense stream of processes willing to share the resource (or a "convoy" of such processes), will prevent the exclusive requester from ever being granted access to the resource.

One solution to this problem, sometimes called "The Fairness Doctrine", is to force all requests for a particular resource to wait if any other request for that resource is already waiting. In this way a process requiring exclusive use of a particular resource will be given access to that resource once all the processes that are using the resource when the exclusive request is made, finally give up access to that resource. This is true regardless of how many processes request shared access to the resource subsequent to the exclusive request. The invention assumes implementation of the "Fairness Doctrine".

We claim:

1. A method of managing lock requests for a resource using a mechanism that serializes lock requests, when at least one exclusive lock request has been received from at least one deadlocked process and at least one shared lock request has been received from at least one deadlocked process, comprising:

determining whether at least one exclusive lock request has been received ahead of at least one shared lock request; and granting at least one shared lock request ahead of at least one exclusive lock request when at least one exclusive lock request has been received ahead of at least one shared lock request.

2. The method according to claim 1, wherein determining comprises:

determining whether at least one shared lock request from a deadlocked process has been granted; and determining whether at least one exclusive lock request has been received ahead of at least one shared lock request, and granting includes granting at least one shared lock request ahead of at least one exclusive lock request when at least one exclusive lock request has been received ahead of at least one shared lock request and at least one shared lock request from a deadlocked process has been granted.

3. The method according to claim 2 where granting includes granting all shared lock requests from deadlocked processes ahead of at least one exclusive lock request from a deadlocked process when at least one exclusive lock request has been received ahead of at least one shared lock request and at least one shared lock request from a deadlocked process has been granted.

4. The method according to claim 1, where granting includes granting all shared lock requests from deadlocked processes ahead of at least one exclusive lock request from a deadlocked process when at least one exclusive lock request has been received ahead of at least one shared lock request.

5. The method according to claim 4, where the resource includes at least one tuple of a table.

6. The method according to claim 1, where the mechanism includes a lock request queue.

7. The method according to claims 4, 2, or 3 where each process is a transaction.

8. A method of managing a plurality of lock requests for a plurality of resources using a plurality of mechanisms that serialize lock requests, when at least one exclusive lock request has been received for each resource from at least one deadlocked process and at least one shared lock request has been received for each resource from at least one deadlocked process, comprising:

determining whether at least one exclusive lock request has been received ahead of at least one shared lock request for each of the plurality of resources; and granting at least one shared lock request ahead of at least one exclusive lock request for each of the plurality of resources when at least one exclusive lock request has been received ahead of at least one shared lock request.

9. The method according to claim 8, where granting includes granting all shared lock requests ahead of at least one exclusive lock request from deadlocked processes for each of the plurality of resources when at least one exclusive lock request has been received ahead of at least one shared lock request.

10. The method according to claim 8, wherein determining comprises:

determining whether at least one shared lock request from a deadlocked process has been granted for each of the plurality of resources; and determining whether at least one exclusive lock request has been received ahead of at least one shared lock request for each of the plurality of resources, and granting includes granting at least one shared lock request ahead of at least one exclusive lock request for each of the plurality of resources when at least one exclusive lock request has been received ahead of at least one shared lock request for each of the resources and at least one shared lock request from a deadlocked process has been granted for each of the resources.

11. The method according to claim 10, where granting includes granting all shared lock requests ahead of at least one exclusive lock request from deadlocked processes for each of the plurality of resources when at least one exclusive lock request has been received ahead of at least one shared lock request for each of the resources and at least one shared lock request from a deadlocked process has been grated for each of the resources.

12. The method according to claim 10, where each of the plurality of resources includes at least one tuple of a table.

13. The method according to claim 8, where the mechanisms comprise lock request queues.

14. The method according to claims 9, 10, or 11 wherein each process is a transaction.

15. A method of resolving locking contention among a plurality of deadlocked processes, where the deadlocked processes have made a plurality of lock requests for a plurality of resources, where at least one exclusive lock request from at least one deadlocked process and at least one shared lock request from at least one deadlocked process have been made for each resource, comprising:

determining whether at least one exclusive lock request has been received ahead of at least one shared lock request for each of the plurality of resources; and granting at least one shared lock request ahead of at least one exclusive lock request for each of the plurality of resources when at least one exclusive lock request has been received ahead of at least one shared lock request for each of the plurality of resources.

16. The method according to claim 15, where the plurality of deadlocked processes are a plurality of pseudo-deadlocked processes.

17. The method according to claim 16 where granting includes granting all shared lock requests ahead of at least one exclusive lock request from deadlocked processes for each of the plurality of resources when at least one exclusive lock request has been received ahead of at least one shared lock request.

18. The method according to claim 17, wherein the lock requests are serialized in lock request queues.

19. The method according to claim 16, where determining comprises:

determining whether at least one shared lock request from a deadlocked process has been granted for each of the plurality of resources; and determining whether at least one exclusive lock request has been received ahead of at least one shared lock request for each of the plurality of resources, and granting includes granting at least one shared lock request ahead of at least one exclusive lock request for each of the plurality of resources when at least one exclusive lock request has been received ahead of at least one shared lock request and at least one shared lock request from a deadlocked process has been granted for each of the plurality of resources.

20. The method according to claim 19, where granting includes granting all shared lock requests ahead of at least one exclusive lock request for deadlocked processes for each of the plurality of resources when at least one exclusive lock request has been received ahead of at least one shared lock request and at least one shared lock request for a deadlocked process granted for each of the plurality of processes.

21. The method according to claim 19, where each of the plurality of resources includes at least one tuple of a table.

22. The method according to claims 17 and 19 wherein each process of the plurality of deadlocked processes is a transaction.

* * * * *